United States Patent
Skelton

(10) Patent No.: US 9,261,093 B2
(45) Date of Patent: Feb. 16, 2016

(54) HEATER AND PUMP PERFORMANCE DIAGNOSTIC FOR A HYBRID BATTERY THERMAL SYSTEM

(75) Inventor: Scott M. Skelton, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 689 days.

(21) Appl. No.: 13/585,889

(22) Filed: Aug. 15, 2012

(65) Prior Publication Data

US 2014/0052411 A1    Feb. 20, 2014

(51) Int. Cl.
| | |
|---|---|
| *G06F 11/30* | (2006.01) |
| *F04B 51/00* | (2006.01) |
| *H01M 10/42* | (2006.01) |
| *B60L 1/00* | (2006.01) |
| *B60L 1/02* | (2006.01) |
| *B60L 11/14* | (2006.01) |
| *H01M 10/625* | (2014.01) |
| *H01M 10/6568* | (2014.01) |
| *B60H 1/00* | (2006.01) |
| *H01M 10/652* | (2014.01) |
| *H01M 6/50* | (2006.01) |
| *B60L 11/18* | (2006.01) |

(52) U.S. Cl.
CPC .................. *F04B 51/00* (2013.01); *B60L 1/003* (2013.01); *B60L 1/02* (2013.01); *B60L 11/14* (2013.01); *B60L 11/1861* (2013.01); *B60L 11/1874* (2013.01); *B60L 11/1875* (2013.01); *H01M 10/4207* (2013.01); *H01M 10/625* (2015.04); *H01M 10/652* (2015.04); *H01M 10/6568* (2015.04); *B60H 1/00278* (2013.01); *B60H 1/00885* (2013.01); *B60L 11/187* (2013.01); *B60L 2240/36* (2013.01); *B60L 2240/421* (2013.01); *B60L 2240/545* (2013.01); *B60L 2240/662* (2013.01); *B60L 2250/10* (2013.01); *H01M 6/5038* (2013.01); *H01M 10/5038* (2013.01); *H01M 10/5077* (2013.01); *H01M 2220/20* (2013.01); *Y02T 10/642* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7291* (2013.01); *Y02T 90/16* (2013.01)

(58) Field of Classification Search
None
See application file for complete search history.

(56) References Cited

U.S. PATENT DOCUMENTS

| | | | | |
|---|---|---|---|---|
| 4,007,315 | A | * | 2/1977 | Brinkmann et al. ............ 429/62 |
| 5,665,484 | A | * | 9/1997 | Bolger ............................ 429/62 |
| 2002/0034682 | A1 | * | 3/2002 | Moores et al. ................. 429/120 |
| 2003/0098009 | A1 | * | 5/2003 | Saito et al. ..................... 123/299 |
| 2009/0139781 | A1 | * | 6/2009 | Straubel ........................ 180/65.1 |
| 2009/0249807 | A1 | * | 10/2009 | Nemesh et al. ................ 62/117 |

(Continued)

*Primary Examiner* — Paul D Lee
(74) *Attorney, Agent, or Firm* — Quinn Law Group, PLLC

(57) ABSTRACT

A system includes a controller, battery pack, fluid, heater, a pump that circulates the fluid to the battery pack through the heater, and a temperature sensor positioned between the heater and battery pack. The controller processes temperature signals from the sensor, diagnoses the pump and heater by turning on the pump in response to a received enabling signal, calculates an absolute value of a temperature gradient of the fluid while the pump remains on, and records a passing pump diagnostic code if the absolute value of the temperature gradient exceeds a calibrated rate. The controller executes a heater diagnostic, after calculating the absolute value of the temperature gradient, only when heating is requested or the absolute value of the temperature gradient does not exceed the calibrated rate. The heater diagnostic includes turning off the pump, cycling the heater on and off, and monitoring the temperature signals for a temperature rise.

14 Claims, 2 Drawing Sheets

(56) References Cited

U.S. PATENT DOCUMENTS

2010/0009246 A1* 1/2010 Maitre et al. .................... 429/62
2011/0214930 A1* 9/2011 Betts et al. ................... 180/65.1
2011/0229749 A1* 9/2011 Kim et al. ..................... 429/120
2012/0028087 A1* 2/2012 Gaben et al. .................... 429/50
2012/0109547 A1* 5/2012 Willey et al. .................... 702/58
2012/0301755 A1* 11/2012 Axelsson et al. ............... 429/62
2013/0052490 A1* 2/2013 TenHouten et al. ............. 429/50

* cited by examiner

HEATER AND PUMP PERFORMANCE DIAGNOSTIC FOR A HYBRID BATTERY THERMAL SYSTEM

TECHNICAL FIELD

The present disclosure relates to a performance diagnostic for a pump and heater of a thermal system for heating or cooling a hybrid battery pack.

BACKGROUND

Certain vehicles are propelled at least part of the time using electrical energy drawn from a high-voltage DC battery pack. The battery pack energizes one or more polyphase electric traction motors via a power inverter. Hybrid electric vehicles selectively use an internal combustion engine as a source of input torque to a transmission, alone or in conjunction with the traction motor(s), while extended-range electric vehicles use a smaller engine only when needed, and solely to power an electric generator. Battery electric vehicles forego use of the small gas engine, and instead operate using stored electrical energy or regenerative braking energy. All three vehicle configurations can operate solely on electricity in what is referred to as an electric vehicle (EV) mode.

In all of the above vehicle embodiments, the high-voltage DC battery pack is used to alternatively store and deliver the substantial amounts of electrical energy needed for driving the traction motor(s). The battery pack, which may consist of multiple battery modules each containing multiple cylindrical or flat/tabular battery cells, generates heat in operation. Effectively dissipating the generated heat is essential to optimizing vehicle performance. As a result, thermal systems are used in conjunction with battery packs to circulate a volume of a suitable cooling fluid through the battery pack and any associated power electronics.

SUMMARY

A system is disclosed herein that includes a battery pack, heat transfer fluid, a heater, a pump that circulates the fluid to the battery pack through the heater, and a temperature sensor. The temperature sensor is positioned in a fluid loop, e.g., between the heater and the battery pack or elsewhere, and measures a temperature of the fluid.

The controller selectively turns on the pump in response to a received enabling signal, e.g., a key-on signal when the system is used as part of a vehicle, and thereafter calculates an absolute value of a temperature gradient of the fluid while the pump remains on. The controller records a passing pump diagnostic code if the absolute value of the temperature gradient exceeds a calibrated rate. The controller then executes a heater diagnostic only when heating is requested via control logic or the calculated absolute value of the temperature gradient does not exceed the calibrated rate. Execution of the heater diagnostic includes turning off the pump, cycling the heater on and off to generate a slug of heated fluid, and monitoring the temperature signals from the temperature sensor for a sufficient temperature rise.

A method is also disclosed for diagnosing the above system. The method includes measuring a temperature of the fluid, receiving an enabling signal via the controller, and turning on the pump in response to the received enabling signal. The method also includes calculating an absolute value of a temperature gradient of the coolant using the temperature signals while the pump remains on, and then recording a passing pump diagnostic code if the absolute value of the calculated temperature gradient exceeds a calibrated rate. That is, the actual temperature gradient can be a negative value. In such a case, the temperature gradient must be less than a calibrated rate. Use of an absolute value for the required comparison allows use of a single calibrated rate.

Additionally, the method includes executing a heater diagnostic, after calculating the absolute value of the temperature gradient, only when battery heating is requested or when the absolute value of the calculated temperature gradient does not exceed the calibrated rate, including turning off the pump, cycling the heater on and off, and monitoring the temperature signals for a calibrated temperature rise as noted above.

The above features and advantages and other features and advantages of the present invention are readily apparent from the following detailed description of the best modes for carrying out the invention when taken in connection with the accompanying drawings.

DETAILED DESCRIPTION

Figure 1:
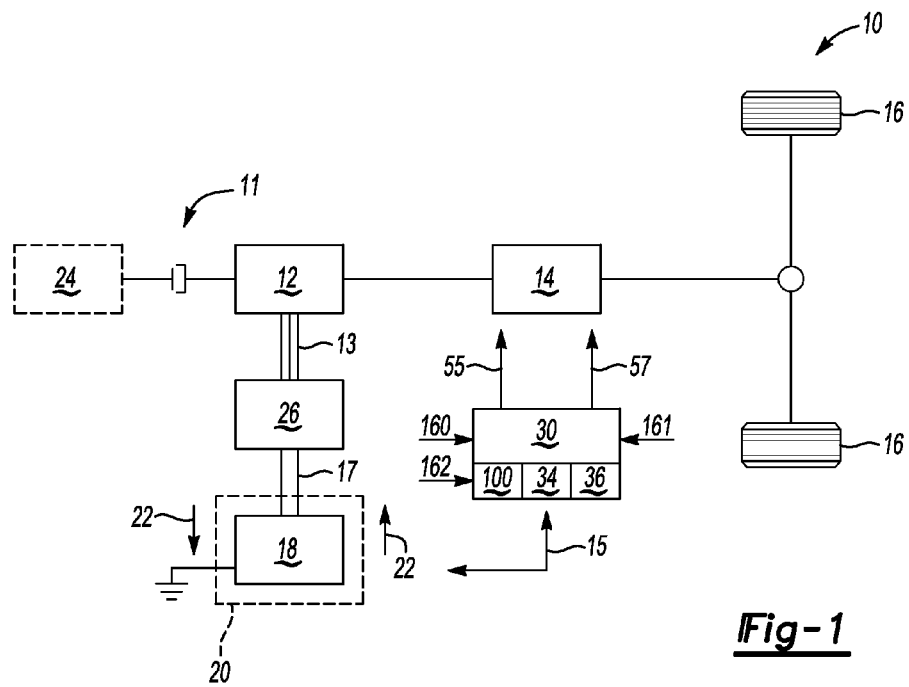
FIG. 1 is a schematic illustration of a vehicle having a high-voltage battery pack, a thermal system used to heat or cool the battery pack, and a controller which diagnoses the performance of a pump and a heater of the thermal system.

Referring to the drawings, an example vehicle 10 is shown schematically in FIG. 1 having a high-voltage electric traction motor 12, a transmission 14, and a set of drive wheels 16. The vehicle 10 also includes a rechargeable battery pack 18 that is cooled via a thermal system 20, an example of which is described in greater detail below with reference to FIG. 2. The thermal system 20 circulates a heat transfer fluid (arrow 22), e.g., coolant or air, through the battery pack 18 in order to provide heat to or dissipate heat from the battery pack 18 during its operation. While not shown in FIG. 1 for added simplicity, the same thermal system 20 may be used to circulate the fluid (arrow 22) through the various power electronics used to control the traction motor 12, e.g., a traction power inverter module (TPIM) 26, an auxiliary power module/DC-DC converter (not shown), etc.

Figure 2:
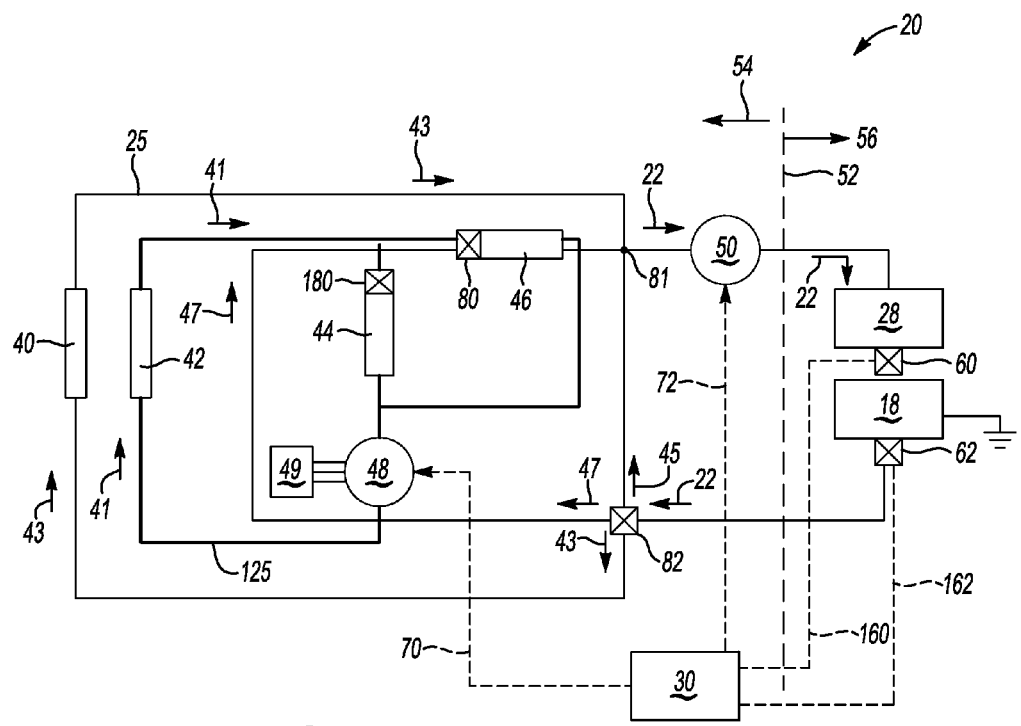
FIG. 2 is a schematic illustration of an example thermal system that may be used aboard the vehicle shown in FIG. 1.
Figure 3:
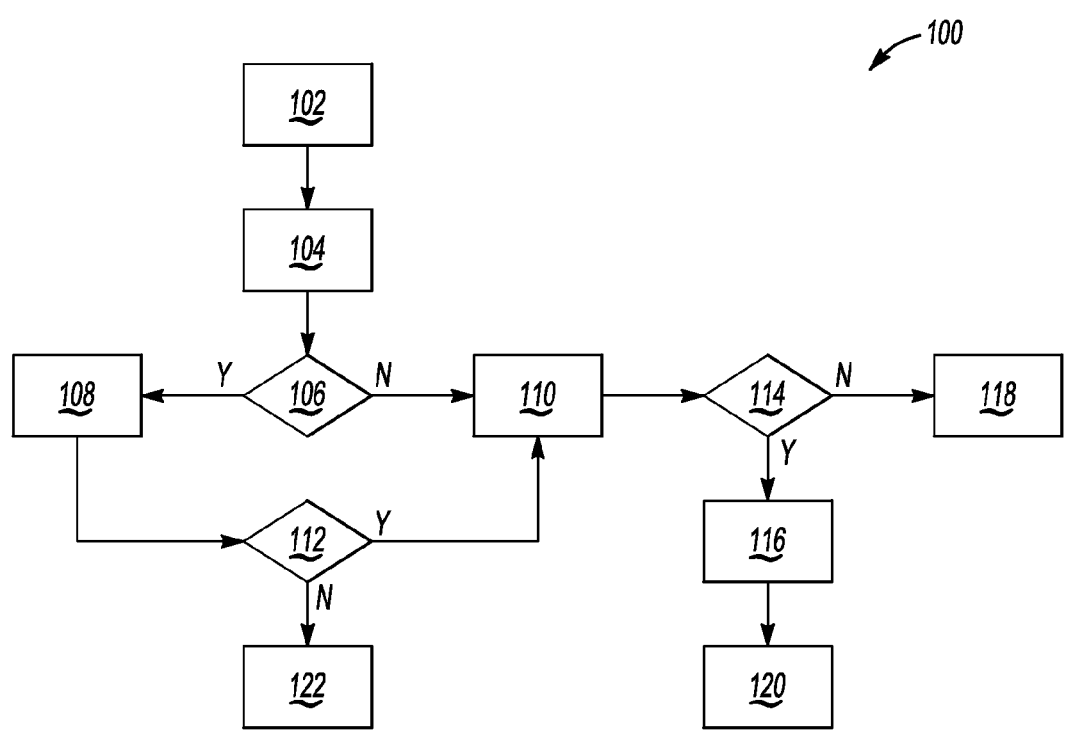
FIG. 3 is a flow chart describing an example method for diagnosing the pump and heater of the thermal system shown in FIG. 2.

A controller 30, the function of which is described in detail below with reference to FIG. 3, is in communication with the various components of the thermal system 20 over a communications bus 15, for instance a controller area network (CAN) bus of the type known in the art. To meet on-board diagnostic requirements in an energy efficient manner, the controller 30 executes instructions embodying a method 100 to diagnose the performance of primary components of the thermal system 20, including a heater 28 and a pump 50 as shown in FIG. 2. The present diagnostic approach is intended to function as an energy-efficient alternative to conventional diagnostic methods by providing for diagnosis of the pump 50 of FIG. 2 without always requiring use of the heater 28 in the conventional manner. Thus, use of the present approach may provide certain energy savings while also reducing unnecessary usage of the heater 28.

The vehicle 10 shown in FIG. 1 may include an optional internal combustion engine 24 as shown in phantom, for instance when the vehicle 10 is configured as a hybrid electric vehicle or an extended-range electric vehicle rather than a battery electric vehicle. In one possible embodiment, the engine 24 may be connected to the input of the traction motor 12 via an input damping clutch 11. Torque from the engine 24 can be used to power the fraction motor 12 when needed, either directly or via generation of electricity. The engine 24 may be alternatively connected to the transmission 14 to deliver input torque directly to the transmission 14 in another configuration.

The thermal system 20 and accompanying method 100 described herein may be used with any high-voltage battery pack 18 that uses a thermal system such as the thermal system 20 for heating and cooling. While vehicle propulsion is a suitable application for the battery pack 18 and the traction motor 12, the present approach may be used in non-vehicular applications using a battery similar to the battery pack 18 shown in FIG. 1 without departing from the intended inventive scope. Thus, the configuration shown in FIG. 1 is intended as an illustrative, non-limiting example embodiment.

The example traction motor 12 shown in FIG. 1 draws electrical energy from and delivers electrical energy to the battery pack 18. The battery pack 18 thus forms a rechargeable energy storage system for energizing all high-voltage electrical components used aboard the vehicle 10. As used herein, the term "high voltage" refers to a voltage level in excess of any auxiliary/12 VDC voltage levels normally used to power auxiliary vehicle systems such as audio systems, lighting, and the like. The battery pack 18 may be rated for approximately 60 VDC to over 300 VDC depending on the power rating of the fraction motor 12. Other battery designs may be used at lower voltage ratings. However, the need for a dedicated fluid cooling loop decreases with decreasing voltage output, and thus the remaining examples will refer back to the high-voltage components shown in FIG. 1.

When the fraction motor 12 is configured as a polyphase AC induction machine, the vehicle 10 may also include the TPIM 26 noted above. The TPIM 26 is electrically connected to the battery pack 18 via a high-voltage DC bus 17, and to the traction motor 12 via a high-voltage AC bus 13. The TPIM 26 may be controlled via pulse-width modulation and high-speed semiconductor switching, as is well understood in the art, in order to convert AC power generated by the fraction motor 12 into DC power suitable for storage in the battery pack 18, and to convert the stored DC power back to AC power as needed for powering the traction motor 12. Such functions generate substantial amounts of heat, and thus require fluidic cooling via the thermal system 20. Likewise, when the battery pack 18 is used in cold weather, the performance of switching components and other electrical devices can degrade, and thus the thermal system 20 can be used to heat the battery pack 18 as needed.

The controller 30 shown in FIG. 1 executes instructions or code embodying the present method 100 from a tangible, non-transitory memory device 36 using received temperature signals (arrows 160, 162), the origins of which are explained below with reference to FIG. 2. Execution of the method 100 allows a processor 34 of the controller 30 to diagnose the performance of the thermal system 20. The controller 30 may be configured as a digital computer having, as the memory device 36, read only memory (ROM), flash memory, and/or other magnetic or optical storage media.

The controller 30 also includes sufficient random access memory (RAM), electrically-erasable programmable read only memory (EEPROM), and the like. Additionally, the controller 30 may include a high-speed clock, analog-to-digital (A/D) and digital-to-analog (D/A) circuitry, and input/output circuitry and devices (I/O), as well as appropriate signal conditioning and buffer circuitry to provide a fully functional hardware and software control device.

Heating control signals (arrow 161) may be generated or received by the controller 30 in an example embodiment to determine when battery heating is required of the thermal system 20. That is, battery heating is a result of controls logic which looks at several parameters such as battery temperature, coolant temperature, ambient temperature, battery state of charge (SOC), vehicle operating mode such as charging, driving, etc., and vehicle fault information, for example, heating is not requested via the control signals (arrow 161) if the inlet transducer 60 (see FIG. 2) is broken.

Referring to FIG. 2, the controller 30 ultimately executes suitable control actions in response to a diagnosis of the heater 28 and pump 50. As part of such control actions, the controller 30 may output diagnostic codes (arrows 55 and 57) for the heater 28 and pump 50, respectively, with each diagnostic code having a corresponding pass or fail status. Other control actions may include illuminating a warning lamp, transmitting a code to a remote location or portable device, repair or replacement of the heater 28 or pump 50, etc.

The thermal system 20 shown in FIG. 2 includes fluid conduit 25, 125, e.g., lengths of pipe, tubing, and/or hydraulic/pneumatic hose and any required fittings. Underhood components of the thermal system 20 are included on a first side (arrow 54) of an imaginary dividing line 52. The other side of the line 52 is indicated by arrow 56, and represents the battery coolant elements of the thermal system 20 evaluated via the present approach.

On the battery coolant side (arrow 56), the battery pack 18 receives the fluid conduit 25 and routes the fluid conduit 25 internally in proximity to heat-generating elements such as conductive battery cells (not shown). Fluid (arrow 22) is moved into the battery pack 18 by suction generated by the pump 50. The speed of the pump 50 is ultimately controlled using speed signals (arrow 72) transmitted to the pump 50 by the controller 30, or by another suitable control device.

The heater 28 of FIG. 2 is positioned just upstream of the battery pack 18. A temperature sensor 60 such as a thermocouple is positioned downstream of the heater 28 at or near a fluid inlet to the battery pack 18. A similar sensor 62 may be positioned at the outlet of the battery pack 18, and used, for instance, to evaluate the actual cooling occurring across the battery pack 18. Temperature signals (arrows 160, 162) from the respective temperature sensors 60, 62, are fed to the controller 30 over the communications bus 15 of FIG. 1 or wirelessly during the course of execution of the present method 100, an example of which is shown in FIG. 3 and described below.

Still referring to FIG. 2, the underhood side, i.e., the side indicated by arrow 54, may include a radiator 40 and condenser 42 of the type known in the art. Fluid flow (arrows 43) within the fluid conduit 25 ultimately passes to a node 81, where the various fluid flows (arrows 43) coalesce into a single stream to define the flow of fluid (arrow 22) that is ultimately drawn into the pump 50. A four-way coolant mode valve 82 may be used to divert some of the fluid (arrow 22) used in the thermal system 20 to a chiller 46 as shown. For instance, the valve 82 may divide the flow of fluid (arrow 22) such that a flow (arrow 47) enters the chiller 46, a flow (arrow 43) enters the radiator 40, and a flow (arrow 45) reaches node 81. The chiller 46 may be part of an air conditioning system having an air conditioning compressor 48, the function of which is controlled via an air conditioning control module 49, or optionally via signals (arrow 70) when the controller 30 includes such functionality.

The air conditioning compressor 48 shown in FIG. 2 delivers refrigerant flow (arrows 41) to the condenser 42, and ultimately to the chiller 46 via a thermal expansion valve 80. A similar thermal expansion valve 180 may be used in conjunction with an evaporator 44. All components of the thermal system 20 of FIG. 2 are shown schematically in FIG. 2. As will be appreciated by those having ordinary skill in the art, the thermal system 20 may include additional fluid control components and sensors to fully embody an air conditioning system having the desired functionality. However, in order to properly function in accordance with the method 100 described below, all embodiments of the thermal system 20 must include at least the pump 50 and the heater 28, i.e., a flow device for circulating fluid (arrow 22) to the battery pack 18 and a heating device configured to raise the temperature of the fluid (arrow 22) as needed.

Referring to FIG. 3, an example method 100 is shown for diagnosing the performance of the pump 50 even when operation of the heater 28 is not required, unlike conventional approaches requiring concurrent operation of the heater 28 for evaluation of the pump 50. The controller 30, in executing the method 100, takes advantage of opportune conditions to save energy and decrease unnecessary cycling of the heater 28.

Beginning with step 102, the controller 30 of FIGS. 1 and 2 first detects an enabling signal, such as a key-on event in which the vehicle 10 is running, and then proceeds to step 104. Step 102 is therefore a precondition to execution of the remainder of method 100.

At step 104, once execution of the method 100 has been enabled at step 102, the controller 30 turns on the pump 50 shown in FIG. 2. The pump 50 begins to circulate fluid (arrow 22) through the battery pack 18. The method 100 proceeds to step 106 while the fluid (arrow 22) continues to flow.

At step 106, the controller 30 next receives the temperature signals (arrow 160) from the temperature sensor 60, or alternately from any other temperature sensor positioned in the flow of fluid (arrow 22), and then calculates the absolute value of the temperature gradient of the fluid (arrow 22). The calculated absolute value of the temperature gradient is compared to a calibrated rate. If the absolute value of the temperature gradient exceeds the calibrated rate, i.e., the temperature of the fluid 22 is rising or falling faster than could naturally occur absent flow of the fluid (arrow 22), the method 100 proceeds to step 108. Otherwise, the method 100 proceeds to step 110.

At step 108, the controller 30 records a diagnostic code for the pump 50 (arrow 57 of FIG. 2) with a status indicating that the pump 50 is functioning properly. The method 100 then proceeds to step 112.

At step 110, the controller 30 next runs a heater diagnostic. For instance, the controller 30 may turn off the pump 50 and turn on the heater 28. The heater 28 remains on for a calibrated duration, after which the controller 30 turns the heater 28 back off again. A slug of heated fluid (arrow 22) is generated by this step. The method 100 then proceeds to step 114.

At step 112, the controller 30 determines whether battery heating has been requested via the control signals (arrow 161) shown in FIG. 1. The control signals (arrow 161) used in step 112 could be automatically generated, for instance, when outside temperature or an internal temperature of the battery pack 18 drops below a calibrated minimum threshold. If heating has not been requested, the method 100 proceeds to step 122. Otherwise, the method 100 proceeds to step 110.

At step 114, as a result of step 112 the controller 30 shown in FIGS. 2 and 3 should see a rise in the inlet temperature to the battery pack 18, as measured by the temperature sensor 60. Acting on this assumption, the controller 30 compares the inlet temperature (arrow 160) to an expected temperature rise, and proceeds to step 116 if the expected temperature rise is detected. Otherwise, the method 100 proceeds to step 118.

At step 116, the controller 30, having detected the expected rise in temperature at step 114, runs a subsequent diagnostic of the pump 50. Step 116 may entail turning the pump 50 back on, a control action which should result in a drop in temperature of the fluid (arrow 22) entering the battery pack 18 of FIGS. 1 and 2 as measured by the temperature sensor 60. The method 100 proceeds to step 120. The execution of step 116 may provide a second diagnosis of the pump 50 if the criteria in step 106 were not met. Thus, the pump 50 is always evaluated, but unlike conventional methods, the heater 28 is only evaluated in response to a negative result at step 106 or a request for heating at step 112.

At step 118, the controller 30 records a failing diagnostic code for the heater 28 in memory device 36. Subsequent control actions may be taken as a result of step 118, including repair or replacement of the heater 28 and/or illumination of an indicator lamp.

At step 120, the controller 30 next records a passing or failing diagnostic code for the pump 50 depending on the result of step 116. That is, if the expected temperature drop as measured by the temperature sensor 60 occurs, the controller 30 records the diagnostic code in the memory device 36 with a corresponding passing status. If the expected temperature drop does not materialize within a calibrated window, however, this indicates either an unexpectedly slow performance or a failure of the pump 50. In this instance, the controller 30 records the diagnostic code with a corresponding failing status. As with step 118, any appropriate control actions may be taken as a result of a failing pump diagnostic code, including repair or replacement of the pump 50, illumination of a warning lamp, etc.

At step 122, the controller 30 completes method 100 by recording a diagnostic code indicating an incomplete evaluation of the heater 28. That is, step 112 is arrived at after successful evaluation of the pump 50 at step 108. Because heating is not requested at step 112, the heater diagnostic of step 110 is not executed in the present diagnostic cycle.

Execution of the method 100 described above thus results in four possible diagnostic results: a failing heater 28, regardless of the performance of the pump 50; a passing pump 50 with a passing heater 28; a passing pump 50 without diagnosing the heater 28; and a failing pump 50 with a passing heater. The present approach satisfies on-board diagnostic (OBD) requirements in a relatively energy efficient manner by minimizing the unnecessary use of electrical energy and excessive cycling of high-voltage components.

While the best modes for carrying out the invention have been described in detail, those familiar with the art to which this invention relates will recognize various alternative designs and embodiments for practicing the invention within the scope of the appended claims.

The invention claimed is:

1. A system comprising:
 a battery pack;
 a supply of heat transfer fluid;
 a heater;
 a pump that circulates the fluid to the battery pack through the heater;
 a temperature sensor configured to measure a temperature of the fluid; and
 a controller in communication with the temperature sensor, the pump, the battery pack, and the heater, wherein the controller includes a processor and tangible, non-transitory memory on which is recorded instructions for diagnosing the performance of the heater and the pump;
wherein the controller, via the processor, receives and processes temperature signals from the temperature sensor, and is configured to:
turn on the pump in response to a received enabling signal;
calculate a temperature gradient of the coolant entering the battery pack using the temperature signals while the pump remains on;
record a passing pump diagnostic code if the absolute value of the calculated temperature gradient exceeds a calibrated rate in the form of a calibrated temperature gradient value; and
execute a heater diagnostic, after calculating the temperature gradient, only when heating is requested or the absolute value of the calculated temperature gradient does not exceed the calibrated temperature gradient value, including turning off the pump, cycling the heater on and off, and monitoring the temperature signals for a calibrated temperature rise.

2. The system of claim 1, further comprising an electric traction motor that is electrically connected to the battery pack.

3. The system of claim 2, further comprising a transmission having an output member connected to a set of drive wheels, wherein the electric traction motor delivers torque to the transmission using electrical energy drawn from the battery pack.

4. The system of claim 3, wherein the controller detects a key-on state of a vehicle as the enabling signal.

5. The system of claim 1, wherein the controller is configured to record a failing heater diagnostic code when the calibrated temperature rise does not occur.

6. The system of claim 1, wherein the controller is further configured to run a pump diagnostic when the calibrated temperature rise occurs, and to record a passing or failing pump diagnostic code corresponding to the result of the pump diagnostic.

7. The system of claim 6, wherein the pump diagnostic includes turning on the pump after cycling the heater, detecting the presence or absence of a calibrated drop in temperature of the fluid using the temperature signals, and recording a passing or failing pump diagnostic code when the calibrated drop in temperature is present or absent, respectively.

8. The system of claim 1, further comprising an air conditioning compressor and a chiller, wherein the fluid is passed from the chiller to the pump.

9. A method for diagnosing a system having a battery pack, heat transfer fluid, a heater, and a pump that circulates the fluid to the battery pack through the heater, the method comprising:
measuring a temperature of the fluid;
receiving an enabling signal via a controller;
turning on the pump, via a controller, in response to the received enabling signal;
calculating, via the controller, an absolute value of a temperature gradient of the fluid using the temperature signals while the pump remains on;
recording a passing pump diagnostic code if the absolute value of the temperature gradient exceeds a calibrated rate in the form of a calibrated temperature gradient value; and
executing a heater diagnostic, after calculating the absolute value of the temperature gradient, only when battery heating is requested or the absolute value of the temperature gradient does not exceed the calibrated temperature gradient value, including turning off the pump, cycling the heater on and off, and monitoring the temperature signals for a calibrated temperature rise.

10. The method of claim 9, further comprising: detecting a key-on state of a vehicle as the enabling signal.

11. The method of claim 9, further comprising: recording a failing heater diagnostic code when the calibrated temperature rise does not occur.

12. The method of claim 9, further comprising: executing a pump diagnostic using the controller when the calibrated temperature rise occurs, and recording a passing or failing pump diagnostic code corresponding to the result of the pump diagnostic.

13. The method of claim 12, wherein executing the pump diagnostic includes:
turning on the pump after cycling the heater;
detecting the presence or absence of a calibrated drop in temperature of the fluid using the temperature signals; and
recording a passing or failing pump diagnostic code when the calibrated drop in temperature is present or absent, respectively.

14. A method for diagnosing a thermal system in a vehicle, wherein the thermal system includes a battery pack, heat transfer fluid, a heater, and a pump that circulates the fluid to the battery pack through the heater, the method comprising:
measuring a temperature of the fluid at a point in which the fluid enters the battery pack;
detecting a key-on state of the vehicle as an enabling signal;
receiving the enabling signal via a controller;
turning on the pump, using the controller, in response to receipt of the enabling signal;
calculating, via the controller, an absolute value of a temperature gradient of the fluid the battery pack using the temperature signals while the pump remains on;
recording a passing pump diagnostic code if the calculated absolute value of the temperature gradient exceeds a calibrated rate in the form of a calibrated temperature gradient value;
executing a heater diagnostic, after calculating the absolute value of the temperature gradient, only when battery heating is requested or the calculated absolute value of the temperature gradient does not exceed the calibrated rate, including turning off the pump, cycling the heater on and off, and monitoring the temperature signals for a calibrated temperature rise;
recording a failing heater diagnostic code in memory of the controller when the calibrated temperature rise does not occur; and
executing a pump diagnostic using the controller when the calibrated temperature rise occurs, including turning on the pump after cycling the heater, detecting the presence or absence of a calibrated drop in temperature of the fluid using the temperature signals, and recording a passing or failing pump diagnostic code when the calibrated drop in temperature is present or absent, respectively.

* * * * *